United States Patent
Bauer et al.

(10) Patent No.: US 7,137,413 B2
(45) Date of Patent: Nov. 21, 2006

(54) ARRANGEMENT TO INCREASE THE THERMAL FATIGUE RESISTANCE OF GLASS TUBES FLOWED THROUGH BY FLUID AND PRESSURE-LOADED

(75) Inventors: Günter Bauer, Tirschenreuth (DE); Nikolaus Benz, Weiden (DE)

(73) Assignee: Schott AG, Mainz (DE)

( * ) Notice: Subject to any disclaimer, the term of this patent is extended or adjusted under 35 U.S.C. 154(b) by 134 days.

(21) Appl. No.: 10/361,402

(22) Filed: Feb. 10, 2003

(65) Prior Publication Data
US 2003/0221734 A1 Dec. 4, 2003

(30) Foreign Application Priority Data
Feb. 11, 2002 (DE) ................. 102 05 548

(51) Int. Cl.
*F15D 1/00* (2006.01)
(52) U.S. Cl. .................. 138/39; 138/114; 126/663; 126/673; 165/177
(58) Field of Classification Search .............. 138/39, 138/42, 108, 112–114, 148; 126/673, 635, 126/655, 652, 663, 665; 165/177
See application file for complete search history.

(56) References Cited

U.S. PATENT DOCUMENTS

| | | | | | |
|---|---|---|---|---|---|
| 2,460,482 | A | * | 2/1949 | Abbot | 126/605 |
| 3,830,173 | A | * | 8/1974 | Hubble | 138/114 |
| 3,952,724 | A | * | 4/1976 | Pei | 126/655 |
| 4,186,724 | A | * | 2/1980 | Nelson | 126/657 |
| 4,194,042 | A | | 3/1980 | Dates et al. | 428/332 |
| 4,205,655 | A | * | 6/1980 | Hunt | 126/635 |
| 4,282,857 | A | * | 8/1981 | Pei | 126/584 |
| 4,299,203 | A | * | 11/1981 | Skopp | 126/638 |
| 4,440,156 | A | * | 4/1984 | Takeuchi et al. | 126/652 |
| 4,452,233 | A | * | 6/1984 | Goodman et al. | 126/653 |
| 4,554,908 | A | * | 11/1985 | Hanlet et al. | 126/652 |
| 4,644,934 | A | * | 2/1987 | Kaus | 126/640 |
| 4,653,471 | A | * | 3/1987 | Takeuchi et al. | 126/635 |
| 4,995,427 | A | * | 2/1991 | Berchem | 138/155 |

FOREIGN PATENT DOCUMENTS

| | | |
|---|---|---|
| DE | 78 34 482 | 11/1978 |
| DE | 29 36 831 | 4/1980 |
| DE | 298 08 532 | 11/1998 |
| JP | 5-52428 | 3/1993 |

* cited by examiner

*Primary Examiner*—James Hook
(74) *Attorney, Agent, or Firm*—Baker & Daniels

(57) ABSTRACT

An arrangement to increase the thermal fatigue resistance of glass tubes having fluid flowing therethrough and being pressure-loaded. This arrangement comprises a glass tube, into which an interior component is inserted. The interior component can be designed as thin-walled tube or tubular component. In accordance with a first example the cavity enclosed by the interior component is hydraulically connected with the interior of the glass tube. The wall thickness of the interior component is smaller than the wall thickness of the glass tube and the interior component is partially free from a direct heat connection with the glass tube. In accordance with a second example the interior component increases the wall thickness of the glass tube. In this case the interior component is touching the interior circumference of the glass tube.

21 Claims, 4 Drawing Sheets

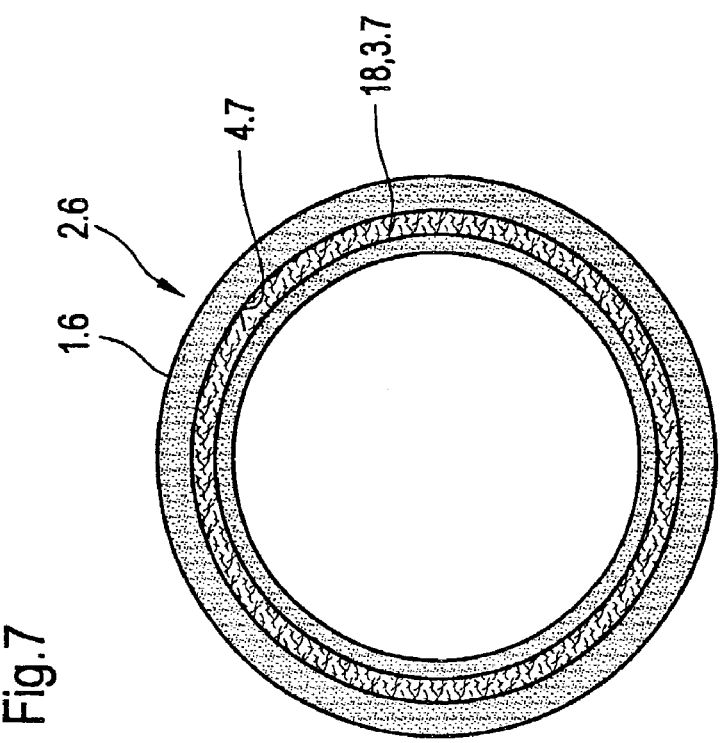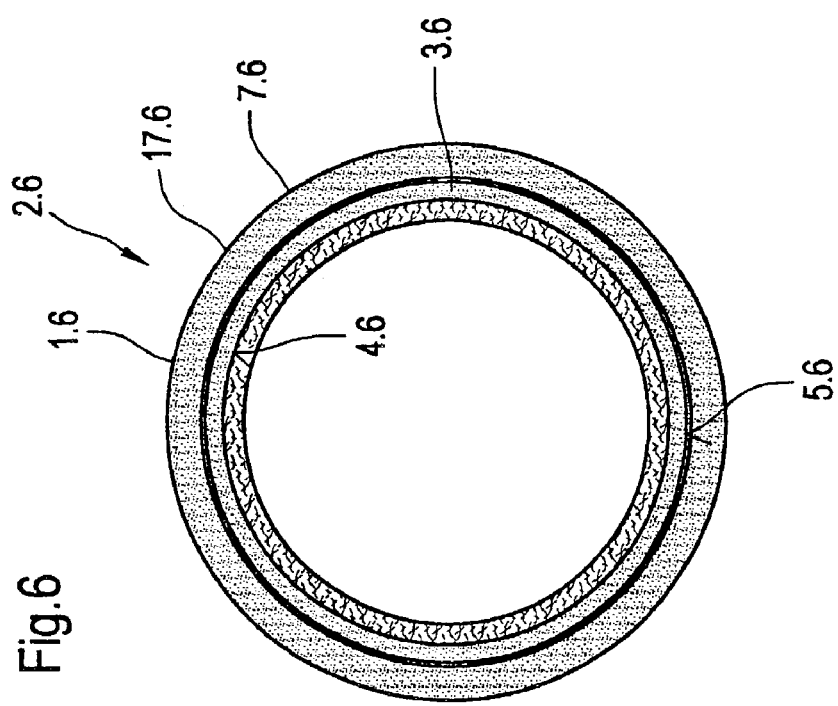

ARRANGEMENT TO INCREASE THE THERMAL FATIGUE RESISTANCE OF GLASS TUBES FLOWED THROUGH BY FLUID AND PRESSURE-LOADED

BACKGROUND OF THE INVENTION

The invention relates to an arrangement to increase the thermal fatigue resistance of glass tubes through which fluid flows and are pressure-loaded and the use of such an arrangement in a heat exchanger or an absorber tube for solar collectors.

Tubular components made from glass are frequently used to guide a flow medium in heat exchangers and absorber tubes of solar collectors. The thermal fatigue resistance presents a substantial problem, whereby said thermal fatigue resistance can be described as a function of the type of glass, the geometrical design and the dimensioning. Such glass tubes must usually exhibit a minimum wall thickness due to the pressure prevailing in the interior. This leads to the fact that extreme temperature changes of the fluid flowing in the interior can lead to glass breaks due to the thermal conducting behavior of the tube wall and the associated stresses. In particular when filling an absorber tube made from glass in high-evacuated solar collectors, which is filled during downtime conditions with a cold heat transfer medium, temperature change of approx. 250 K can occur. This leads then to the fact that the inside of the glass tube cools down significantly, however a high difference between the interior circumference and the outer circumference of the glass tube can be observed due to the thermal conducting behavior in the wall of the glass tube. The ensuing unacceptable high temperature gradient in the wall of the glass tube usually causes a damage of the glass tube due to the associated stresses, which can often lead to a complete break. In order to solve this problem so far, essentially two solution courses were followed. In accordance with a first solution fluid contact with the inner wall of the glass tube was avoided by a hydraulically separated fluid-containing tube, which was slid into the glass tube, whereby said separate tube was connected heat-conclusively to the glass tube by suitable dimensioning and/or additional heat-transferring measures. A substantial disadvantage of this design consisted in the associated higher costs as well as a poor heat transfer between the glass tube and the fluid, as the heat transfer could not take place directly, but took place first at the wall of the fluid-containing tube and then via convection in the gas contained in the gap and then again heat transfer took place from the wall of the glass tube to the inner wall of the glass tube respectively in reverse order with a cooled down flow medium.

In accordance with a second solution it was directed to the use of high-quality glasses, which already exhibit a sufficient thermal fatigue resistance. This solution is however characterized by substantially higher costs, whereby the availability of such materials must be ensured. Furthermore it is not possible to use known standardized prefabricated simple glass tubes for certain standard applications, but only these special, high-quality tubes.

SUMMARY OF THE INVENTION

It is therefore the task of the invention, to develop an arrangement to increase the thermal fatigue resistance of glass tubes flown through by fluid and pressure-loaded, which is characterized by a low expenditure for design and production, causes low costs and which does not make special demands regarding the availability of the materials to be used. The manufacturing is to take place as easily as possible and the individual glass tube should be able to be integrated into this arrangement as easily as possible.

The solution according to the invention is to provide a hollow cylindrical interior component that can that can be inserted into the glass tube wherein the cavity defined by the interior component is hydraulically connected with the interior of the glass tube. The wall thickness of the interior component is smaller than the wall thickness of the tube and an interior component is at least partially free of a direct thermal connection with the glass tube in the condition where fluid is flowing through the glass tube.

The arrangement to increase the thermal fatigue resistance of glass tubes having fluid flowing therethrough and being pressure-loaded comprises a glass tube into which a hollow cylindrical interior component is inserted according to the invention, which has a smaller wall thickness than the glass tube and which is at least partially, preferably completely, free of a direct thermal connection with the glass tube in the condition of the glass tube being flown through by fluid. i.e. that the interior component is circulated around by fluid on two sides—at the outer circumference and at the interior circumference. The flow takes place pressure-free with a completely coaxial arrangement of the interior component to the glass tube. Between the interior of the interior component and the remaining interior of the glass tube exists a hydraulic connection, i.e. no fluid guidance separate from the fluid guidance in the gap between outer circumference of the interior component and interior circumference of the glass tube takes place in the interior of the interior component, i.e. the area circumscribed by the interior circumference. Due to the associated heat transfer between the fluid and the interior component the cooling of the inner surface of the glass tube can be delayed, so that unacceptable temperature gradients at the wall of the glass tubes are avoided. The interior component has a smaller wall thickness than the glass tube.

The hollow cylindrical interior component can be formed by a
1) pipe-shaped component or
2) a tubular component.

In the first case the interior component is formed by a thin-walled glass tube or plastic tube. In the second case the interior component can be designed flexible according to the material choice and the dimensioning in axial and/or radial direction. This offers the benefit that the solution according to the invention can be used with very high elasticity of the tubular interior component also very easily in curved longer tubes, whereby the expenditure for inserting the interior component is relatively low. In accordance with a particularly favorable embodiment thin-walled plastic tubes are preferably used as interior components for easy assembly. With these no additional consideration has to be given to the possible danger of fracture because of mechanical stress during assembly.

The interior component, independently of its arrangement as thin-walled glass tube or plastic tube or tubular component, can thereby be guided freely in the glass tube without guide device or however with guide device. In the arrangement without guide device the interior component is adjacent to the interior circumference of the glass tube in the condition of no fluid flowing through, while in the condition of fluid flowing through the position of the interior tube is localized in relation to the glass tube due to the flowing fluid.

In the other case, the design with guide device, the guide device can either be designed as a) one-piece with the glass tube
b) one-piece with the interior component
c) separate component.

The solution c) is preferably used, since no special accommodations at the components glass tube or interior component are to be made and therefore standardized components and/or prefabricated components can be used, which can be combined if necessary with an additional guide device. This guide device can be connected with the glass tube interlocking and positively actuated. The guide device is preferably located positively actuated in the glass tube, for example through clamping. The guide can furthermore be connected with the interior component interlocking and/or positively actuated. In order to avoid unnecessary stresses the connection between guide device and interior component is provided with a very large fit, so that only a crude position adjustment of the interior component in relation to the glass tube takes place. The main function of the guide device is thereby a position adjustment in the condition of no fluid flowing through, in particular during the transport of the arrangement according to the invention in order to avoid damages to the interior component or the glass tube.

The interior component extends preferably over the whole axial extension of the glass tube, so that a similar cooling behavior can be achieved over the total length of the glass tube. It is however also conceivable, in particular with very long glass tubes, that a multiplicity of interior components be used, which are arranged neighboring each other but do not have a connection with one another. This offers the benefit that the interior component does not inevitably have to be adapted to the length of the glass tube, but that prefabricated, possibly standardized interior components can be used, which form the unit interior component by being assembled.

With the first solution a thermal connection between the interior component and the wall of the glass tube is made by the fluid. In accordance with a further second solution the thermal connection between interior component and glass tube is realized by the fact that either a) the interior component is designed in such a manner, that its outer circumference is adjacent to the interior circumference of the glass tube or
b) the glass tube is provided with a coating, which takes over the function of the interior component.

In this case the arrangement of a multilayer wall takes place, whereby the layers exhibit different thermal conductivity. Thus the direct contact of the fluid with the inner surface of the glass tube is avoided and a cooling takes place only indirectly through the coating respectively the interior component. The interior component is here likewise formed by a pipe-shaped or tubular component, whereby the interior circumference of the glass tube corresponds to the outer circumference of the interior component. Preferably synthetic materials are used as materials, for example PTFE.

The solution according to the invention can be used with glass tubes with only an external wall and glass tubes with tubes arranged in the inside for the coaxial guidance of the flow medium. Special fields of application for the arrangement according to the invention are heat exchangers, where the components guiding the heat distribution media are formed by glass tubes and furthermore absorber tubes for solar collectors.

BRIEF DESCRIPTION OF THE DRAWINGS

The solution according to the invention is following described with the drawings.

FIG. 6 shows a further design with an interior component, which is connected thermally directly with the wall of the glass tube;

FIG. 7 illustrates an arrangement of a glass tube with coating at the inner surface.

DETAILED DESCRIPTION

Figure 1:
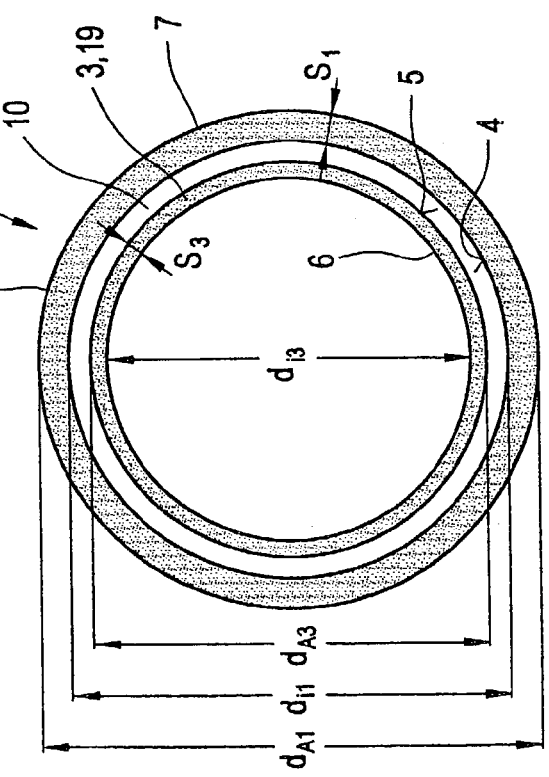
FIG. 1 illustrates a first design according to the invention in a diagrammatic simplified view using a cross-section through a glass tube.

FIG. 1 illustrates an arrangement according to the invention using a diagrammatic simplified sectional view through a glass tube 1 to increase the thermal fatigue resistance of glass tubes through which fluid flows and are pressure-loaded. The arrangement is marked with 2. This comprises an interior component 3 in form of a thin-walled glass tube 19, which is slid into the glass tube 1 to be protected, in particular into the interior 10 surrounded by said glass tube. Glass tube 1 and interior component 3 are connected hydraulically with one another, i.e. the interior component 3 does not form an interior separate from the interior 10. The outside diameter $d_{A3}$ of the thin-walled tube 19 is smaller than the inside diameter $d_{I1}$, of the glass tube 1. In the condition of being flown through by fluid of the glass tube 1 both—both glass tube 1 and thin-walled tube 19—are free of a direct thermal connection by direct contact, in particular the inner surface 4 of the glass tube 1 characterized by the inside diameter $d_{I1}$, and the external surface 5 of the interior component 3 in form of the thin-walled tube 19, which is characterized by the outside diameter $d_{A3}$. The thin-walled tube 19 when viewed in the cross section has a smaller wall thickness $S_3$ than the glass tube 1. The wall thickness $s_1$ is thereby a function of the pressure created by the fluid in the glass tube 1. This requires a certain minimum wall thickness $s_1$ during flow The minimum wall thickness of the thin-walled tube 19 can be substantially smaller, since due to the circulation on two sides, i.e. at the interior circumference and at the outer circumference, no one-sided pressure is exercised on the wall 6 of the interior component 3, which is executed as thin-walled tube 19. A change of the temperature of the fluid flowing through the glass tube 1 causes, due to thermal conduction, heat transfer and convection in the fluid, a change of the temperature at the wall 7 of the glass tube 1, in particular at the inner surface 4 characterized by the inside diameter $d_1$. The glass tube 1 is filled with a cold fluid during downtime conditions in particular in applications in heat exchangers or absorber tubes. The temperature change can be thereby approx. 250 K. A heat transfer only between the wall 7 and the fluid causes the inner surface 4 of the glass tube 1 to cool down fast. By providing the interior component 3 in form of the thin-walled tube 19, due to convection in the fluid a transition between said tube and the wall 6 and the fluid takes place. Between both tubes—glass tube 1 and tube 19—thereby no direct heat exchange takes place, but only indirect heat exchange via the fluid flowing through the glass tube 1. The thin-walled tube 19 is preferably manufactured from glass.

Figure 2A:
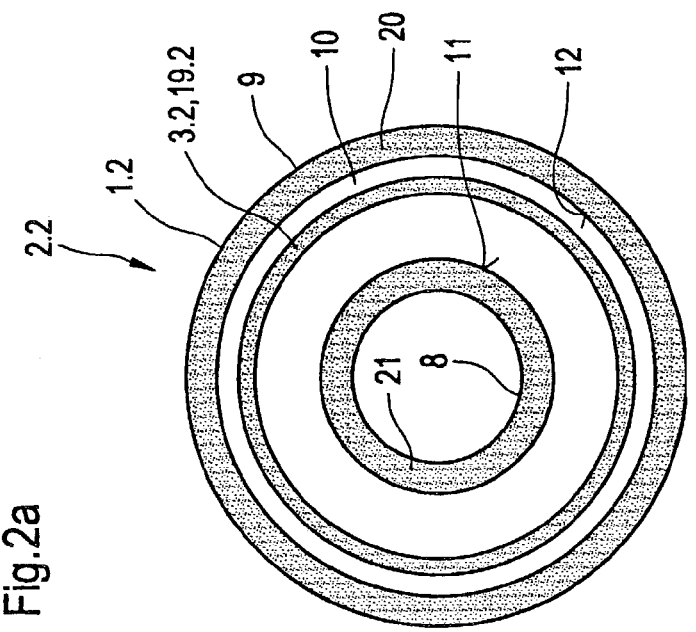
FIGS. 2a and 2b illustrate a second design according to the invention using a sectional view through a glass tube.
Figure 2B:
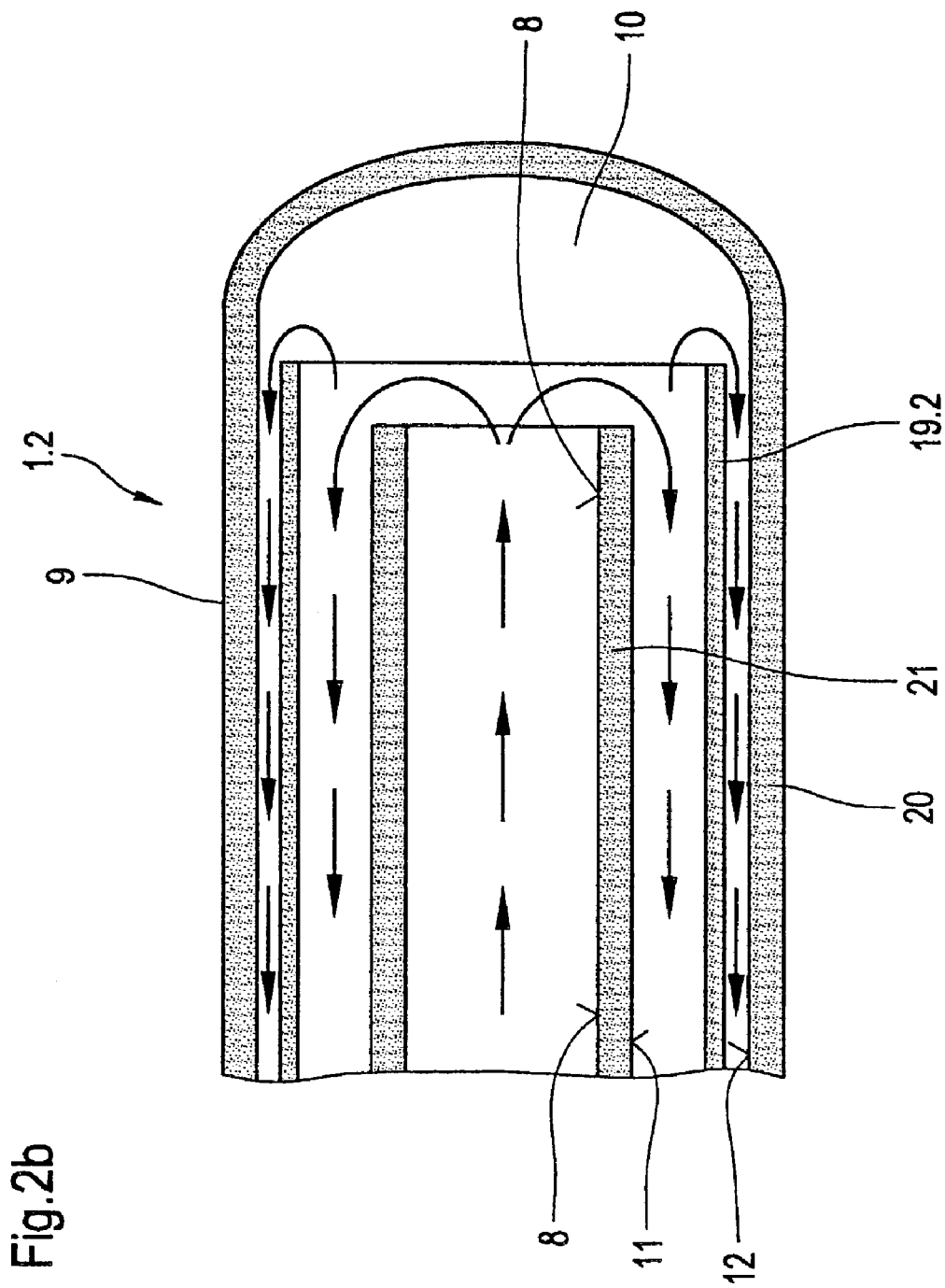

FIGS. 2a and 2b illustrate an arrangement 2.2 according to the invention for a glass tube 1.2 with coaxial flow, as for example for applications in vacuum tube collectors, in two sectional views. As illustrated, fluid flows inside and outside of the interior component in the same direction. The glass tube 1.2 comprises a first, exterior tube 20 closed on one side, which forms the external wall 9 for the limitation of the interior 10. Furthermore the glass tube 1.2 comprises a second internal glass tube 21, which is arranged in the interior 10 and enables a coaxial through-flow of the glass tube 1.2. For this the second internal glass tube 21 is arranged coaxially to the first, exterior tube 20 closed on one side, inside said exterior tube and is designed open to the interior circumference at the exterior tube 20, in particular the closed side. The interior 10 is thus limited by the interior circumference 8 of the internal glass tube 21, the outer circumference 11 of the second internal glass tube 21 and the interior circumference 12 of the external wall 9, which is formed by the first, exterior tube 20 closed on one side. According to the invention a hollow cylindrical interior component 3.2 in form of a thin-walled tube 19.2, preferably made of glass is inserted into the interior 10 of the hollow tube. Said component is arranged in such a manner in the interior 10 between internal tube 21 and exterior tube 20 that it is at least in the condition of fluid flowing therethrough partially, preferably completely free of contact with the outer circumference 11 and/or with the interior circumference 12 of the internal glass tube 21 respectively the external wall 9 formed by the first exterior tube 20. Also here the wall thicknesses of first exterior tube 20 and second internal tube 21 are designed different in relation to the wall thickness $S_3$, whereby the tubes 20 and 21 are characterized by a larger wall thickness than the one of the interior component 3.2. The interior tube 3.2 is therefore also called a thin-walled tube. Also here the cooling at the interior circumference 12 of the external wall 9 can be delayed due to convection in the fluid and the heat transfer to the thin-walled tube 19.2, which contributes to the improvement of the thermal fatigue resistance of the glass tube 1.2. The second internal tube 21 withstands thereby the thermal shock stress since both its interior circumference 8 and outer circumference of 11 are circulated around by fluid. Unacceptable temperature gradients at the walls of the tubes 20 and 21 of the glass tube 1.2 can thus be avoided.

With the designs represented in FIGS. 1 and 2 the interior component 3 is designed as a thin-walled tube 19, 19.2, i.e. as a tubular component with fixed respectively constant cross section. Furthermore the thin-walled tube is characterized by a fixed shape over its axial extension.

In accordance with a further solution instead of a thin-walled tube 19, 19.2 for the interior component 3, 3.2 also a tubular component, preferably a thin-walled flexible hose, preferably made of synthetic material, can be used. The arrangement according to the invention corresponds to those described in FIGS. 1 and 2, whereby however the thin-walled plastic tubing exhibits both in radial and axial direction a greater flexibility than the thin-walled tube. For both solutions exists the possibility, to guide the interior components 3 freely in the glass tube 1, i.e. without localizing of the position in relation to the glass tube 1. In this case the position localization takes place only due to the forces affecting the interior component 3 when fluid is flowing through.

Figure 3:
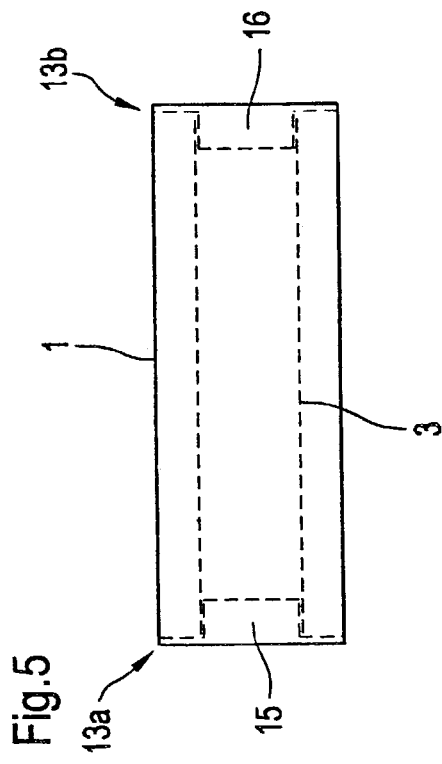
FIG. 3 illustrates a design with interior component, which extends in axial direction over the length of the glass tube.
Figure 4:
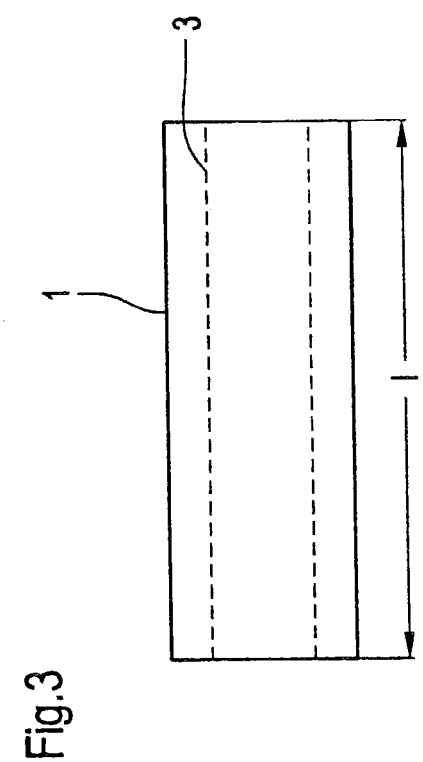
FIG. 4 illustrates a design with interior components arranged one behind the other in axial direction.

According to a particularly favorable arrangement the interior component 3 extends, as in FIG. 3 for designs of the interior component as interior tube or thin-walled plastic tubing over the total extension I of the glass tube 1. For particularly long glass tubes 1 however the insertion of the interior component 3 is associated with an increased expenditure, if damage is to be avoided. Therefore it is conceivable, as shown in FIG. 4, to provide a multiplicity of interior components 3a, 3b and 3c which are arranged in axial direction one behind the other respectively neighboring each other, whereby said components do not have a direct connection with one another. In order to meet the requirement according to the invention, it is however not inevitably required that the individual interior components 3a to 3.n have to touch each other at their faces 14.12 and 14.21 to 14.n2 and 14.(n+1)1 which face each other. Distances a between two interior components 3.n and 3.n+1 arranged in axial direction neighboring each other would be likewise conceivable, whereby these distances a should be kept as small as possible and should not be larger than the axial extension of an interior component 3.n. Such an arrangement is shown in FIG. 4 in a diagrammatic simplified view as a side view of a glass tube 1.

Figure 5:
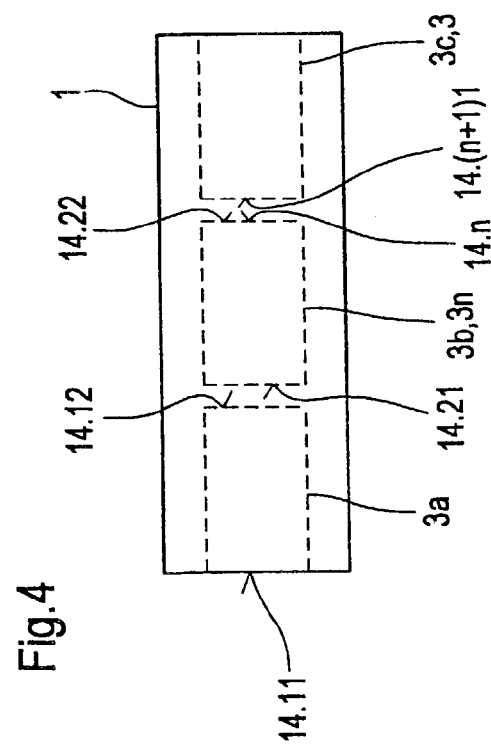
FIG. 5 illustrates an arrangement with a guide device of the interior component in the glass tube.

Concerning the position localization between the glass tube 1 and the interior component 3 it is possible to locate the interior component 3 inside the glass tube 1. One possibility is represented in FIG. 5. From this figure it is evident that in each case suitable guide devices 15 and 16 are arranged within the axial end areas 13a, 13b of the interior component 3. These guide devices can be designed differently and can be formed by the glass tube 1 or however preferably by a separate component, which is interlocking or positively actuated connected with the interior component 3 and the glass tube 1.

FIG. 5 illustrates thereby the design of the guide devices 15 and 16 in form of a fixture, which fits in the interior component 3 and is clamped in relation to the interior circumference of the glass tube 1. These guide devices 15 and 16 are located in the glass tube 1 preferably positively actuated, in this case by clamping. Furthermore the guide device can be connected with the interior component interlocking and/or positively actuated. In the represented case the connection between guide 15 respectively 16 and interior component 3 is provided with at least one clearance fit in order to avoid unnecessary stresses, so that only a crude position adjustment of the interior component in relation to the glass tube takes place. The main function of the guide device is thereby a position adjustment in the condition of no fluid flowing through, in particular during the transport of the arrangement according to the invention in order to avoid damage to the interior component or the glass tube.

FIG. 6 illustrates a second design example of an arrangement 2.6 according to the invention to increase the thermal fatigue resistance of glass tubes 1.6 through which fluid flows and are pressure-loaded. The glass tube 1.6 is shown as cross section in a diagrammatic simplified view. Within this design the outside diameter $d_{43}$ of the interior component 3.6 is dimensioned in such a manner that its external surface 5.6 is adjacent to the inner surface 4.6 of the glass tube 1.6. The interior component however is not connected with the glass tube 1.6 by interlocking or being positively actuated. The wall 7.6 of the glass tube 1.6 and the wall of the interior component 3.6 form thereby functionally a multilayer wall 17.6, which consists of two layers. Both layers, the layer formed by the wall of component 3.6 and the layer formed by the wall 7.6, are characterized by a different heat transfer behavior, so that a cooling of the inner surface 4.6 of the glass tube 1.6 takes place only slowly when fluid of a low temperature flows through the tube, as basically the wall of the interior component 3.6 is inserted as the first layer. If a material is selected for the wall of component 3.6 which exhibits poor thermal conductivity, the cooling of the inner surface 4.6 can be very significantly delayed, so that unacceptable high stresses, which lead to the damage of the glass tube 1.6, are avoided. It is preferable to use materials for the interior component 3.6, which exhibit a high heat transfer resistance.

The interior component 3.6 in accordance with FIG. 6 can thereby again be formed by a thin-walled glass tube or however by a thin-walled hose-like component, preferably a plastic tubing.

In accordance with an improvement of the design of FIG. 6 in accordance with FIG. 7 the glass tube 1.7 is provided with a coating 18 at the inner surface 4.7, whereby said coating takes over the function of the interior component 3.7. A synthetic material is preferably used as coating 18, which is preferably characterized by a high heat transfer resistance. In this case the interior component 3.7 is connected material-interlocking with the interior circumference 4.7 of the glass tube 1.7.

REFERENCE SYMBOL LIST

1; 1.2; 1.6; 1.7 Glass tube
2; 2.2; 2.6; 2.7 Arrangement to increase the thermal fatigue resistance of glass tubes flown through by fluid and pressure-loaded
3; 3.2; 3.6; 3.7 Interior component
4 Inner surface of the glass tube
5 External surface of the interior component
6 Wall
7 Wall
8 Interior circumference
9 External wall
10 Interior
11 Outer circumference
12 Interior circumference
13a, 13b Axial end areas
14.11 to 14.nn Face
15 Fixture
16 Fixture
17 Wall
18 Coating
19 Thin-walled tube
20 First exterior tube, closed on one side
21 Second internal glass tube
$d_{A3}$ Outside diameter of the interior component
$d_{I1}$ Inside diameter of the glass tube
$d_{A1}$ Outside diameter of the glass tube
$d_{I3}$ Inside diameter of the interior component
$S_3$ Wall thickness of the interior component
$S_1$ Wall thickness of the glass tube

The invention claimed is:

1. An arrangement to increase the thermal fatigue resistance of a glass tube, comprising:
   a glass tube through which fluid flows, said tube closed on one side;
   a hollow cylindrical interior component disposed in the interior of the glass tube;
   a cavity enclosed by the interior component being hydraulically connected with the interior of the glass tube;
   the wall thickness of the interior component being smaller than the wall thickness of the glass tube;
   the interior component being at least partially free of a direct thermal connection with the glass tube in the condition of the glass tube having fluid flowing therethrough;
   the outer circumference of the interior component being smaller than the inner circumference of the glass tube;
   a second tube located inside said glass tube, said second tube being open toward the closed side of said glass tube;
   fluid flowing inside and outside of the interior component in the same direction.

2. The arrangement according to claim 1, wherein the interior component is completely free of a direct thermal connection with the glass tube while fluid flows through said glass tube.

3. The arrangement according to claim 1, wherein the interior component is formed by a tubular component.

4. The arrangement according claim 1, wherein the interior component is flexible in axial and/or radial direction.

5. The arrangement according to claim 1, wherein the interior component is made of synthetic material.

6. The arrangement according to claim 1, wherein the hollow cylindrical interior component is formed by a thin-walled glass tube.

7. The arrangement according to claim 1, wherein the interior component exhibits less thermal conductivity than the glass tube.

8. The arrangement according to claim 1, wherein the interior component extends over the whole axial extension of the glass tube.

9. The arrangement according to claim 1, including multiple interior components which are arranged neighboring each other and which do not have a connection with one another.

10. The arrangement according to claim 1, wherein the interior component is guided in the glass tube.

11. The arrangement according to claim 10, wherein a guide is in the glass tube.

12. The arrangement according to claim 11, wherein the interior component is guided by means of a separate guide at the glass tube.

13. The arrangement in accordance with claim 1 in a heat exchanger.

14. The arrangement in accordance with claim 1 in an absorber tube of a solar collector.

15. An arrangement to increase the thermal fatigue resistance of a glass tube, comprising:
   a glass tube through which fluid flows;
   a hollow cylindrical interior component disposed in the interior of the glass tube;
   a cavity enclosed by the interior component being hydraulically connected with the interior of the glass tube;
   the wall thickness of the interior component being smaller than the wall thickness of the glass tube;
   the interior component being at least partially free of a direct thermal connection with the glass tube in the condition of the glass tube having fluid flowing therethrough;
   the outer circumference of the interior component being smaller than the inner circumference of the glass tube;
   fluid flowing inside and outside of the interior component in the same direction;
   wherein the glass tube comprises a first, exterior tube closed on one side which forms the external wall of the glass tube, and further comprises a second internal glass tube arranged inside which is open towards the closed side of the exterior tube, and the interior component in the condition of having fluid flowing therethrough is at least partially free of a direct thermal connection with the exterior and internal tubes.

16. The arrangement according to claim 15, wherein the internal tube is arranged coaxially to the exterior tube.

17. An arrangement to increase the thermal fatigue resistance of a glass tube through which fluid flows, comprising:
a hollow cylindrical interior component which is arranged in the glass tube, its outer circumference being adjacent to the interior circumference of the glass tube, wherein the interior component has a high heat transfer resistance and is in direct mechanical contact with the glass tube.

18. The arrangement according to claim 17, wherein the interior component is formed by a tubular component.

19. The arrangement according to claim 17, wherein the interior component is flexible in axial and/or radial direction.

20. The arrangement according to claim 17, wherein the interior component is made of synthetic material.

21. The arrangement according to claim 17, wherein the interior component is connected material-interlocking with the glass tube and forms a coating.

* * * * *